Figure 1:
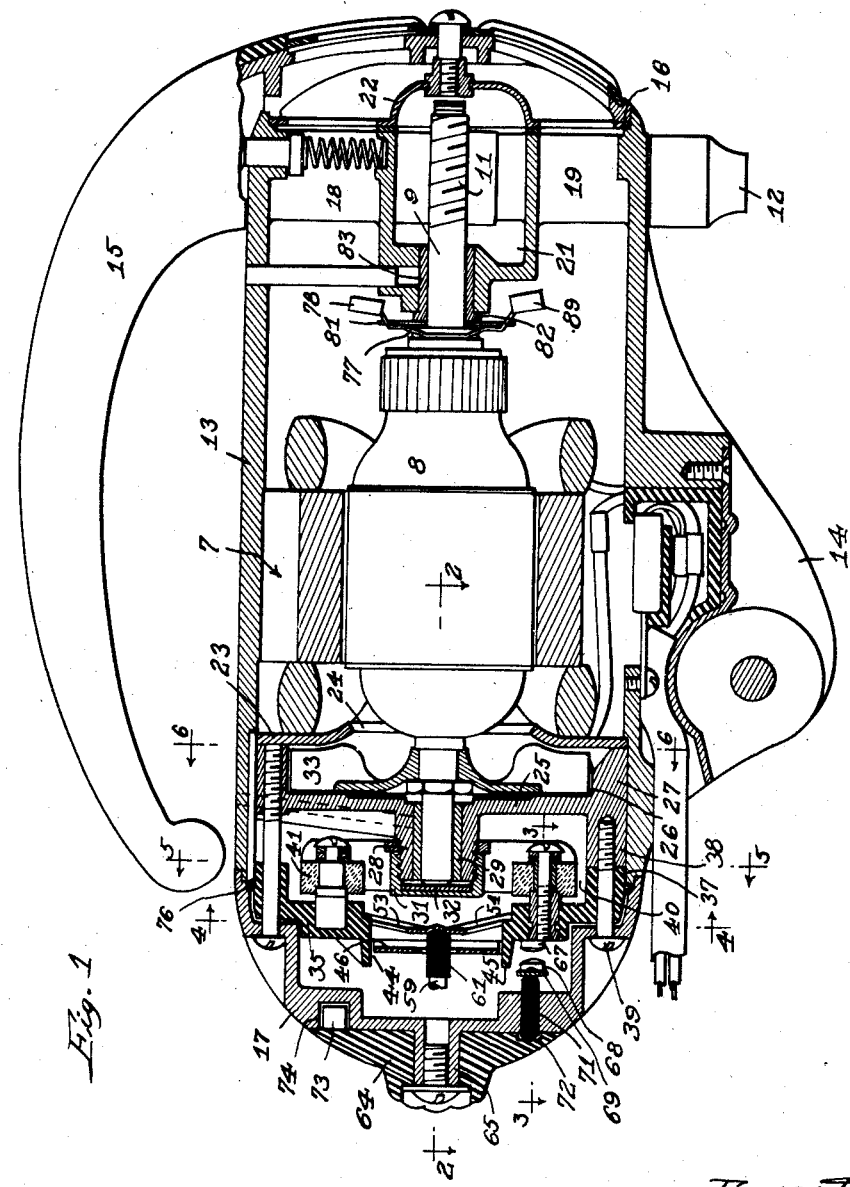

Jan. 24, 1939.   I. JEPSON   2,144,734
COMBINED MOTOR AND SPEED CONTROL DEVICE
Filed Sept. 3, 1936   2 Sheets-Sheet 1

Inventor:
Ivar Jepson
By Wilson, Dowell, McCanna
  & Wintercorn
   Attys.

Jan. 24, 1939.  I. JEPSON  2,144,734
COMBINED MOTOR AND SPEED CONTROL DEVICE
Filed Sept. 3, 1936  2 Sheets-Sheet 2
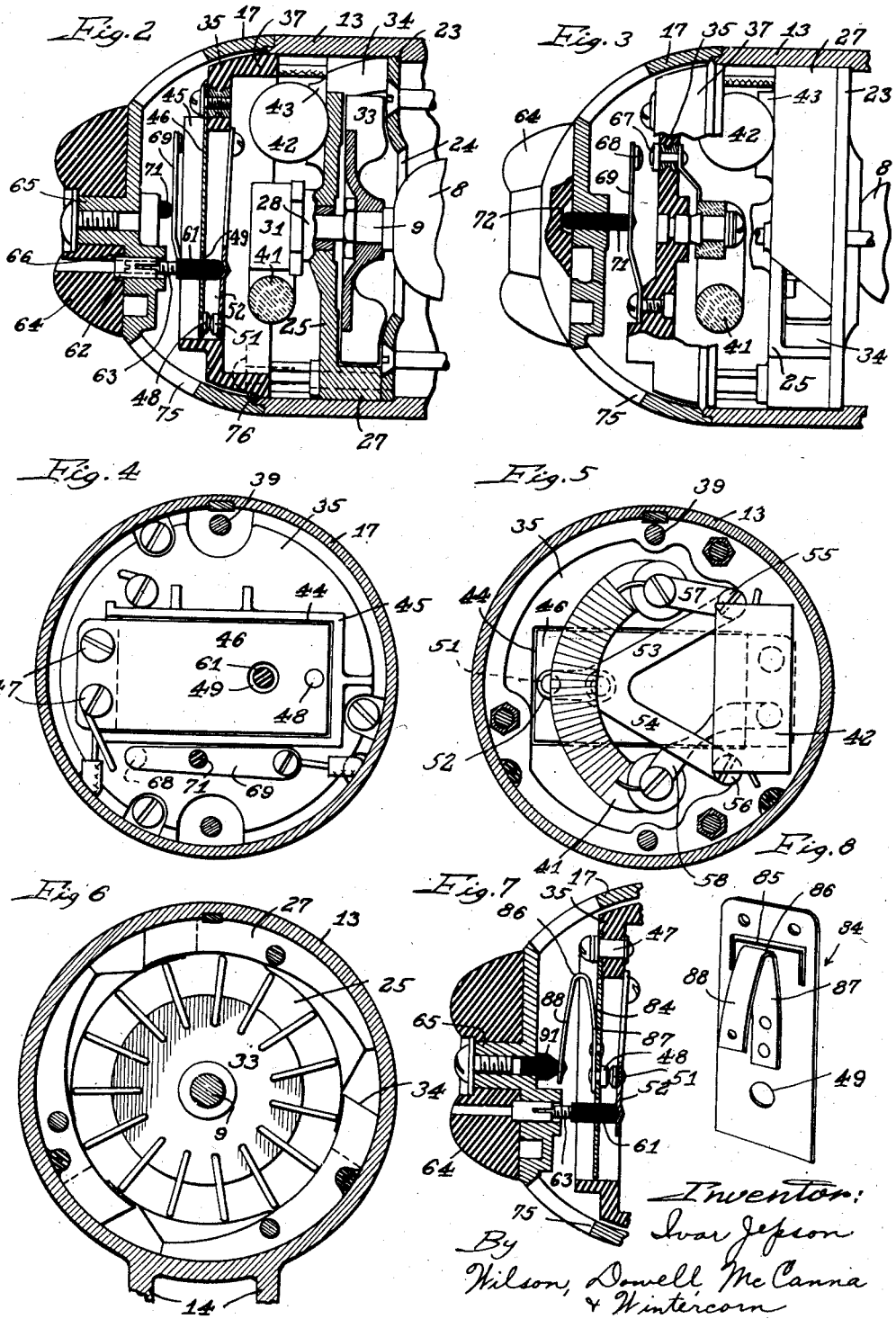
Inventor:
Ivar Jepson
By Wilson, Dowell, McCanna & Wintercorn
Attys.

Patented Jan. 24, 1939

2,144,734

UNITED STATES PATENT OFFICE 2,144,734

COMBINED MOTOR AND SPEED CONTROL DEVICE

Ivar Jepson, Chicago, Ill., assignor to Chicago Flexible Shaft Company, Chicago, Ill., a corporation of Illinois Application September 3, 1936, Serial No. 99,184

10 Claims. (Cl. 171—222)

This invention relates to speed control mechanism for electric motors and is directed more particularly to pneumatically operated means for controlling and regulating the motor speed.

The invention contemplates a motor and a speed control mechanism therefor wherein a flow of air is generated by the motor and a contacting device is positioned in said flow to make and break the current in response to the flow of air embodying improved structural characteristics in the air generating means and in the contact actuating elements.

I have also aimed to provide improved assembly features whereby the cost of construction is materially reduced.

Another object of the invention is the provision of a pneumatically operated contacting device of uniform and sensitive operation.

Other objects and attendant advantages will be apparent from the following description and the accompanying drawings, in which—

Figure 1 is a longitudinal section through a portable mixer unit showing the motor and speed control mechanism;

Fig. 2 is a section on the line 2—2 of Figure 1;
Fig. 3 is a section on the line 3—3 of Figure 1;
Fig. 4 is a section on the line 4—4 of Figure 1;
Fig. 5 is a section on the line 5—5 of Figure 1;
Fig. 6 is a section on the line 6—6 of Figure 1;
Fig. 7 is a section similar to Fig. 2 showing a modified form, and
Fig. 8 is a perspective view of the vane shown in Fig. 7.

The invention is herein shown embodied in a mixer unit of well known type having a motor 7, armature 8 carried on an armature shaft 9, the forward end of which is provided with a worm 11 for driving a pair of laterally spaced spindles indicated generally by the numeral 12 within which beater blades are adapted to be positioned to perform a mixing or beating operation. A casing 13 has spaced depending ears 14 which serve to support the mixer unit upon a suitable pedestal for stationary use of the mixer. A handle 15, structurally disclosed in greater detail and claimed in another application, serves for manual manipulation of the mixer unit.

The casing 13 is of such design as to constitute with end closure members 16 and 17 a complete enclosure for the motor, gear chamber, and speed control mechanism. The casing has upper and lower bosses 18 and 19 within which the spindles 12 are carried, and has a gear chamber designated generally by the numeral 21 within which the worm 11 and associated worm gears are positioned. The end closure member 16 has a portion 22 which closes the forward end of the gear chamber 21 so as to retain lubricant therein.

A disk 23 is secured on its annulus on the inner wall of the casing 13 to the rear of the motor 7 and has a central opening 24 through which the armature shaft 9 passes. An impeller housing member designated generally by 25 is positioned rearwardly of the disk 23 and has an impeller chamber 26 formed by an annular wall 27 which seats against the disk 23. The housing member has a boss 28 within which a sleeve bearing 29 is positioned for the reception of the rear end of the armature shaft 9, a cap 31 being carried on the boss and having a pressure plate 32 forming an end thrust bearing for the shaft. An impeller 33 is positioned on the armature shaft 9 within the chamber 26 and rotates with the shaft to draw air into the chamber 26 through the opening 24 of the plate 23, the air being discharged through a plurality of openings 34 on the annulus of the impeller housing member 25 as best shown in Figs. 3 and 6.

A mounting bracket designated generally by the numeral 35 is positioned to the rear of the impeller housing 25 and is spaced therefrom by annularly arranged spacing parts 37 and 38 on the housing and the bracket, the part 37 being an annular wall on the bracket, the bracket being attached to the housing by means of annularly arranged screws 39. The wall 37 serves as a reenforcement for the face of the bracket and also functions with the part 38 to form a chamber 40 into which the air is conducted and which serves to equalize small variations in the rate of air delivery from the impeller. Attached to the forward side of the bracket 35 is an arcuate insulation member 41 upon which a resistor is carried, which resistor shunts the contact points presently to be described. A condenser 42 is carried on the bracket and interposed between the bracket and the impeller housing, the housing member having seats 43 in which the condenser rests. The resistor, condenser and the bearing boss 28 and associated parts are arranged so as to interfit in the chamber in such manner as to produce a compact, economical and efficient structure. The bracket 35 is in this instance and preferably formed of insulation material and is conveniently molded of synthetic resin such as "Bakelite" or "Micarta." An opening 44 is formed in the bracket 35, which in this instance is relatively large and of rectangular shape. This opening is surrounded on three sides by a rib 45 to provide inner walls for the opening of relatively great width so as to form a straight walled tunnel, channel or passage through the bracket.

Attached to the bracket 35 and extending laterally across the opening 44 is a vane 46, in this instance rectangular in shape and of slightly smaller width than the internal width of the opening 44 and of sufficient length to permit attachment by means of rivets or other fastening members 47 along one end, the opposite end being spaced slightly from the end of the opening adjacent thereto. The vane is in this instance formed of a resilient metal so as to be capable of distortion about its supporting end. The vane carries a contact 48 and has an opening 49 for a purpose presently to be described. It will be observed that the opening 44 and the vane 46 need not necessarily be rectangular but may take any of a wide variety of shapes and yet satisfactorily perform the functions which will appear from this description. A manually adjustable contact 51 is carried on a Y-shaped contact carrier 52 having arms 53 and 54 attached to the bracket by means of screws or other fastening members 55 and 56. The arm 53 is electrically connected to one end of the resistor 41 through a conductor 57 whereas the opposite end of the resistor is connected to the vane 46 through a conductor 58. The position of the contact carrier 52 and the contact 51 is adjustable through a manually adjusted pin 59 having an insulating button 61 thereon bearing against the carrier at the junction of the arms 53 and 54, abutment 61 passing through the opening 49 of the vane 46. The pin 59 is threaded into a split sleeve 62 (Fig. 2) seated for reciprocation in a boss 63 of the cap 17, which reciprocation is manually brought about through rotation of a knob 64 rotatably carried on a boss 65 on the cap 17, the knob having a groove 66 of variable depth for the purpose of moving the sleeve 62 and associated parts inward and outward upon rotation of the knob.

A contact 67 (Figure 1) is carried on the bracket 35 and cooperates with a contact 68 carried on a spring contact member 69 to form a switch. This switch is actuated by a pin 71 seated for longitudinal movement in the cap 17 and arranged at one position of the knob 64 to drop into an opening 72 therein to permit the opening of the contacts 67 and 68. A projection 73 on the knob 64 is received in a groove 74 in the cap 17, the grooves extending through a limited arc so that the ends thereof serve as stops for the rotation of the knob to limit the degree of movement thereof. The cap 17 has a plurality of slots 75 for the discharge of air from the interior of the casing 13 and a packing ring 76 is interposed between the casing 13, the cap 17 and the annulus of the bracket 35 for the purpose of preventing the escape of air at the junction of these parts.

Brake mechanism is provided as and for the purpose described in the copending application of Paul A. Chamberlain, now Patent No. 2,092,955, issued September 14, 1937, which in this instance comprises a centrifugal member designated generally by the numeral 77 having weight members 78 and 79 adapted at low speeds of the motor to urge a friction disk 81 carried on the armature shaft 9 into surface contact with a flange 82 on the bearing member 83 positioned in the wall of the gear chamber 21. This arrangement is such that the maximum braking action occurs at the lower speed and as the speed of the motor increases the braking action progressively decreases, the brake being entirely released at a moderate motor speed.

Figure 1 shows the parts in the "off" position with the contact points 67 and 68 open. When the knob 64 is rotated slightly these contact points are closed, causing the motor to start and to rotate at its lowest speed. Thereupon air is drawn into the front of the casing 13 through openings in the cap 16 by action of the impeller 33 and is moved by the impeller through the openings 34 of the impeller housing member. The air then passes over the resistor 41, through the opening 44 of the bracket, and out through the slots 75 of the cap 17. Upon passing through the opening 44, the flow or stream of air is impeded by the vane 46, the air causing the vane to be moved outwardly in the opening or tunnel 44, thereby moving the contact point 48. When the flow of air exerts a predetermined force on the vane 46 the contact points 48 and 51 will be opened so that the current supply to the motor will be through the resistor 41. Likewise, when the speed of the motor decreases to a point at which the force exerted on the vane 46 is insufficient to maintain the contact points 48 and 51 open, these points will be closed and current will again flow directly to the motor. By rotation of the knob 64 the contact point 51 may be adjusted in position so that more force is required to cause the opening of the contacts 48 and 51; in other words, so that the vane 46 will have to be moved a greater distance against the increase in tension of the vane in order to open these contacts.

The form shown in Figs. 7 and 8 is identical with that heretofore described with the exception that a vane of the type shown in Fig. 8 is employed and a button is threaded into the bore of the boss 65 and projects forwardly into the casing to cooperate with the vane. The vane, indicated generally by the numeral 84, differs from the vane 46 in that it is slotted along its attached end and a short distance along the sides, as indicated at 85, and has a V-shaped spring member 86 attached by one leg 87 to the rearward face, the opposite leg 88 having a depression as shown at 89 against which a button of insulation material 91 bears to apply spring tension to the vane. Through this means the tension on the vane is imparted from the casing rather than from the bracket 35 so that slight changes in the position of this bracket, such as might be occasioned by hard usage, minor differences in assembly or distortion of the bracket will not affect the speed setting.

Attention is directed to the fact that the air emerging from the openings 34 in the impeller housing member passes directly over the resistor so that this forced draft keeps the resistor at a relatively low temperature. The air used in the control of the motor speed is, therefore, also effective to cool the motor and to cool the resistor element.

Attention is also directed to the fact that because of the ribs 45 the opening has a depth in the direction of the vane movement such as to maintain approximately the same air opening throughout the length of the vane stroke, whereby maximum movement is obtained. Furthermore, the opening 44 is slightly larger than the vane so as to allow free movement of the vane without friction and also to allow air to pass through the opening so as to cool the motor and the resistor element.

A feature of the invention lies in the manner in which the various elements are coordinated within the casing, the impeller being positoned adjacent the armature whereby the end of the armature may be carried in a relatively long and fixed bearing on the impeller housing, the bracket 35 being positioned directly adjacent the impeller housing in such manner as to provide an air chamber which acts to equalize small variations in the pressure and wherein the condenser, the resistor, and the bearing for the rear of the armature shaft are nested. Also the provision of an annular wall on the bracket member which serves to reenforce the same and within the concave side of which various parts of the governor assembly are adapted to be carried.

The device described is of particular merit because of its extreme sensitiveness and because of the great uniformity of operation whereby a nicety of control is obtained over the speed of the motor such as has heretofore been unobtainable.

I am aware that numerous alterations and changes may be made in the structure as herein described and shown and I do not wish to be limited except as required by the prior art and the scope of the appended claims, in which, I claim:

1. The combination in an electric motor, of a casing having parallelly disposed transverse partitions forming an intercommunicating motor chamber, an impeller chamber adjacent thereto, and an air reservoir, said reservoir having an outlet, a motor in the motor chamber, contacts relatively movable to open and close the circuit through said motor, means in said impeller chamber to draw air from said motor chamber and deliver the same to said reservoir in proportion to the speed of the motor, and means comprising a flexible sheet metal vane fixed in said outlet positioned to be flexed by the force of air moving therethrough to open and close the contacts in response to said force whereby to maintain a predetermined motor speed.

2. The combination in an electric motor, of a casing having parallelly disposed transverse partitions forming a motor chamber, an impeller chamber adjacent thereto, and an air reservoir, said reservoir having an outlet, the partition between said impeller chamber and said air reservoir having a plurality of annularly spaced openings for the delivery of air to said reservoir and the partition between said motor chamber and said impeller chamber having a centrally disposed opening for the passage of air from the motor chamber to the impeller chamber, a motor in the motor chamber, contacts relatively movable to open and close the circuit through said motor, means in said impeller chamber to draw air from said motor chamber and deliver the same to said reservoir in proportion to the speed of the motor, and means in said outlet positioned to be actuated by the force of air moving therethrough to open and close the contacts in response to said force whereby to maintain a predetermined motor speed.

3. The combination in a speed regulator for electric motors, of contacts arranged for relative movement to make and break the circuit through a motor, means driven by the motor for developing a flow of air proportional to the speed of the motor, and a vane for moving said contacts positioned in the flow of air comprising a spring member rigidly secured along one edge, the opposed edge thereof being free to move under the influence of the air flow through flexure and said spring member.

4. The combination in a speed regulator for electric motors, of the type having contacts arranged for relative movement to make and break the circuit through a motor, and means driven by the motor for developing a flow of air proportional to the speed of the motor, of an air tunnel through which the air is caused to flow, a vane comprising a spring member rigidly secured along one edge, the opposed edge thereof being free to move under the influence of the air flow, for moving said contacts positioned in the tunnel transversely thereof to maintain a predetermined motor speed, a motor casing enclosing said speed regulator, and spring means acting between the casing and said vane for applying a spring tension thereto.

5. The combination in a speed regulator for electric motors, of the type having a pair of contacts arranged for relative movement to make and break the circuit through a motor, and means driven by the motor for developing a flow of air proportional to the speed of the motor, of an air tunnel through which the air is caused to flow, a vane for supporting one of said contacts for movement to make and break said circuit comprising a sheet of resilient metal attached at one edge transversely in said tunnel, the sheet having a slot adjacent said fastened edge to permit the remainder of the sheet to hinge thereon, and spring means acting between the remainder of the sheet and a stationary element to apply spring pressure thereto tending to make said contacts.

6. The combination in a motor and speed regulator therefor of a casing, a motor positioned therein, spaced from one end and having an armature, a plate annularly secured in said end of the casing adjacent the armature, the plate having a central opening for the armature shaft and the passage of air, an impeller housing comprising a plate having an annular wall seated in said casing and against said first mentioned plate to space the impeller plate therefrom and form an impeller chamber, said housing also having a centrally disposed bearing for supporting the end of the armature shaft within the casing and spaced from the end thereof, an impeller on the armature shaft between said plates for generating a flow of air, and contact means in said end of the casing for controlling the speed of the motor in response to the flow of air from said housing.

7. The combination in a motor and speed regulator therefor of a casing, a motor positioned therein spaced from one end and having an armature and shaft, an air impeller on said shaft, a plate positioned transversely in said casing and seating annularly therein, the plate having a centrally disposed bearing member extending rearwardly on the plate and providing lateral and end thrust support for the armature shaft, a bracket comprising a transverse plate of insulation material seated annularly in said casing in rearward spaced relation to the first mentioned plate, an annular wall on the last mentioned plate extending forwardly for reenforcing the same and spacing said plates to form an air chamber to receive air from said impeller, and an arcuate resistor carried on the forward side of the last mentioned plate, said plates being so spaced that the bearing and the resistor nest into the said chamber, and contact means carried on the last mentioned plate for controlling the speed of the motor in response to the flow of air from said chamber.

8. The combination in a speed control mechanism for electric motors, of means driven by the motor for developing a flow of air proportional to the speed of the motor, means to confine the flow of air having an outlet provided with side walls to form a tunnel, a vane positioned in said tunnel transversely to the flow of air and movable through a defined stroke under the influence of the air, a movable contact point positioned on said vane, a resilient contact carrier positioned transversely of said tunnel and beyond the stroke of said vane, a normally stationary contact positioned thereon to cooperate with the movable contact, and means operative on said contact carrier for manually moving the position of the stationary contact whereby to predetermine the speed of the motor at which said contacts will open and close.

9. The combination in a speed control mechanism for electric motors, of means driven by the motor for developing a flow of air proportional to the speed of the motor, means to confine the flow of air having an outlet provided with side walls to form a tunnel, a vane positioned in said tunnel transversely to the flow of air and movable through a defined stroke under the influence of the air, a movable contact point positioned on said vane, a V-shaped contact carrier positioned transversely of said tunnel and fixedly secured at the free ends of its arms, a contact point positioned thereon adjacent the junction of said arms and arranged to cooperate with said movable contact to open and close the circuit through the motor and thereby maintain a predetermined motor speed, and means operative through the vane for adjusting the position of said stationary contact point to select said predetermined speed.

10. A vane for use in fluid speed regulating devices comprising a sheet of resilient metal adapted to be fixedly supported at one edge transversely to the flow of fluid, the sheet having a slot adjacent said fastening edge to permit the remainder of the sheet to hinge thereabout, and spring means attached to the sheet intermediate its ends adapted to act between the sheet and a stationary element to apply spring pressure thereto.

IVAR JEPSON.